United States Patent Office 3,356,189
Patented Dec. 5, 1967

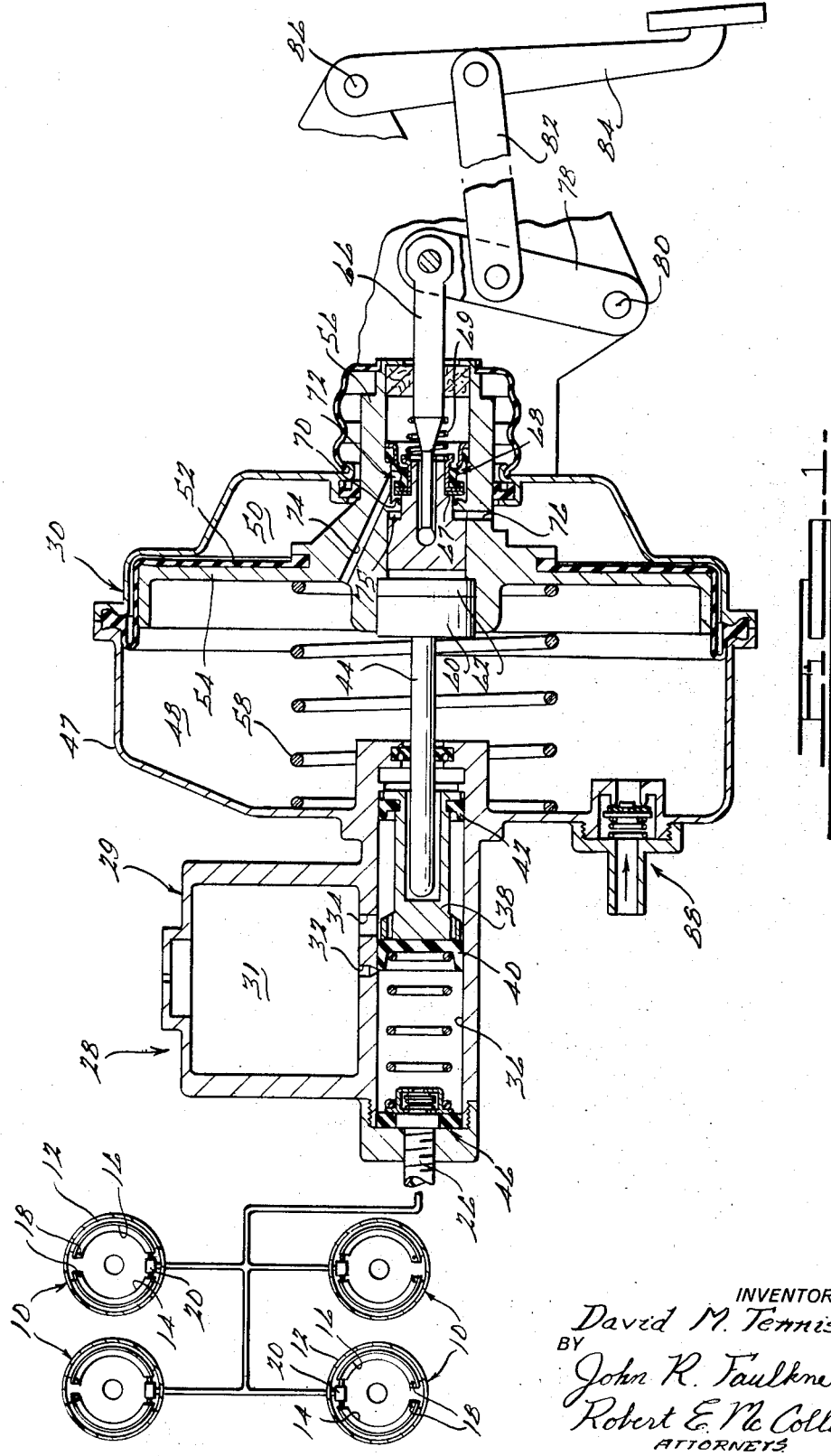

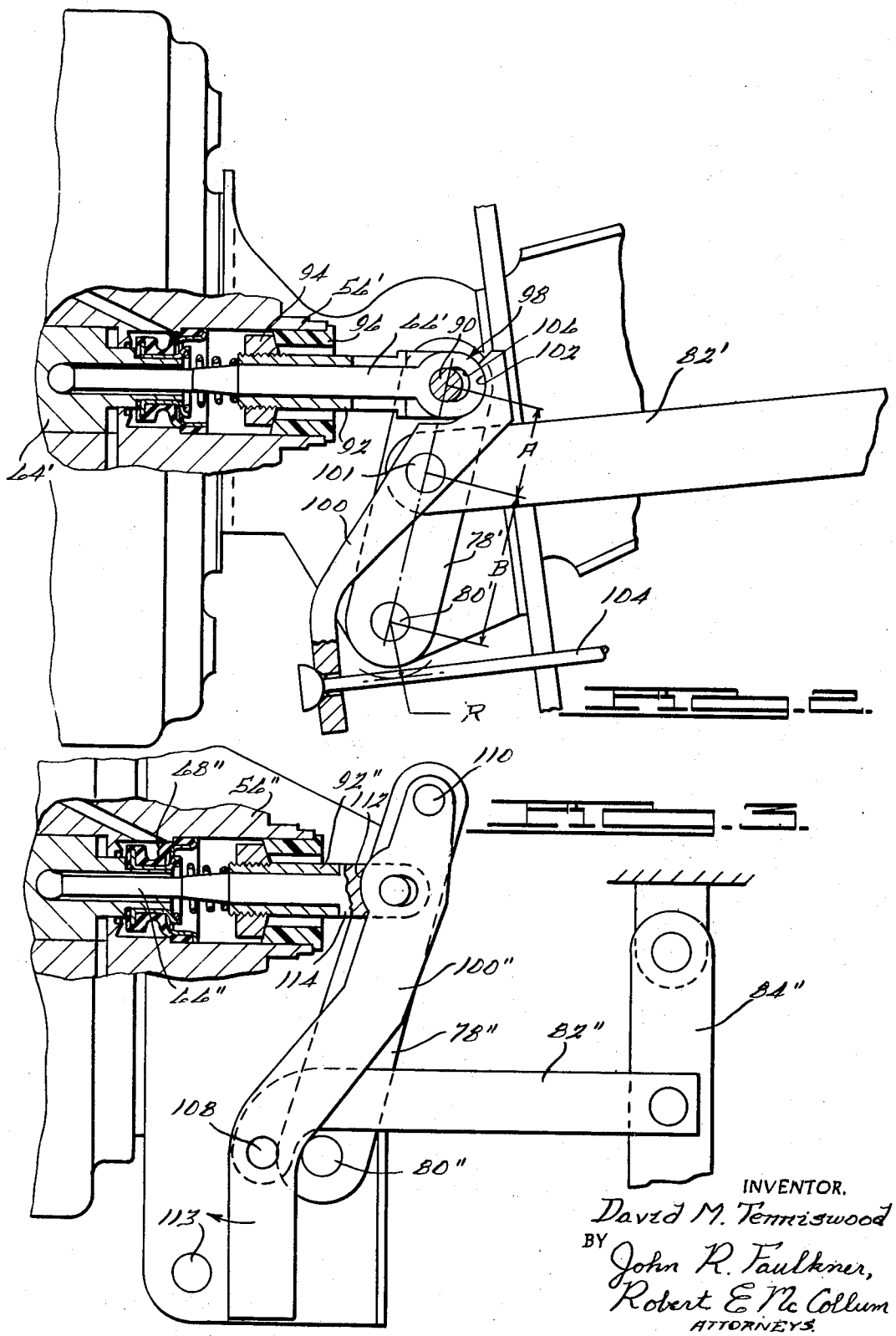

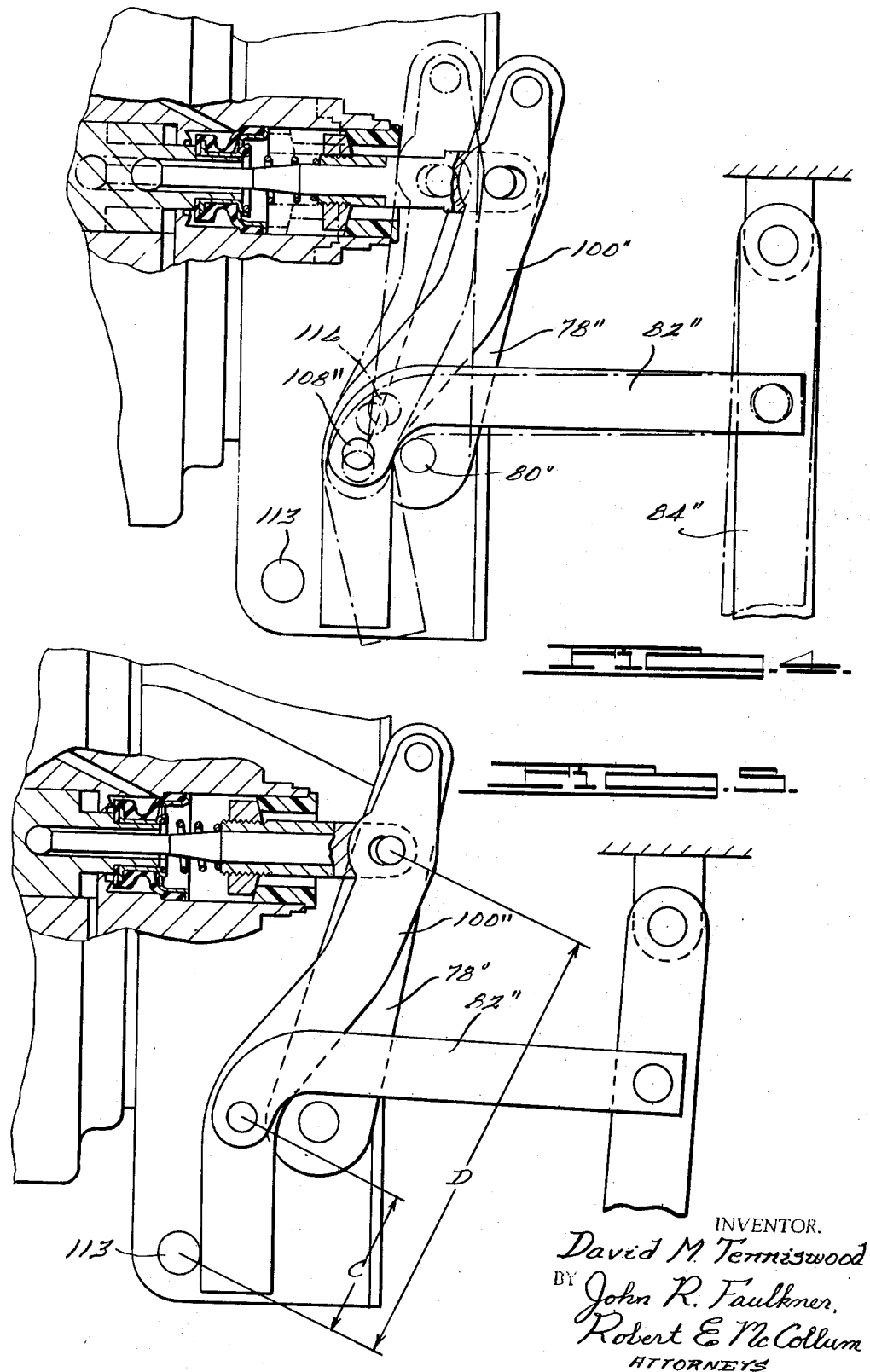

1

3,356,189
MINIMUM TRAVEL POWER BRAKE ACTUATOR
David M. Tenniswood, Detroit, Mich., assignor to Ford
Motor Company, Dearborn, Mich., a corporation of
Delaware
Filed Dec. 21, 1965, Ser. No. 515,404
16 Claims. (Cl. 188—106)

ABSTRACT OF THE DISCLOSURE

A motor vehicle power brake system has a mechanical, manually operated linkage effecting actuation of the power mechanism and engagement of the vehicle brakes substantially concurrent with initial movement of the conventional brake pedal; the linkage consisting of two pivotally interconnected links that are further operatively interconnected to each other and to a brake master cylinder operating plunger by lost motion means permitting limited relative arcuate movement between them; one link further having a fixed pivot spaced from the interconnecting pivot; the two links having essentially common instantaneous pivot centers effecting first a pivotal movement of one link relative to the other about the interconnecting pivot and through the lost motion means to actuate the power mechanism whereby the power mechanism acting through the lost motion means pivots both links about the essentially instantaneous centers to actuate the brake master cylinder; and, of which the following is a specification.

---

This invention relates, in general, to a motor vehicle brake assembly. More particularly, it relates to a mechanical linkage for initiating operation of a motor vehicle power brake mechanism.

One of the primary objects of the invention is to provide a motor vehicle brake actuating linkage that can be controlled to provide as little or as much travel of the operator-moved brake control member as is desired.

Another object of the invention is to provide a motor vehicle brake actuating linkage that can be operated either by the conventional brake pedal, or by the fingers and hands of the vehicle operator.

A still further object of the invention is to provide a power brake actuator consisting of a mechanical linkage including two arcuately swingable levers pivotally interconnected in such a manner that the operator need move one of the levers by only an extremely small amount to fully apply the brakes.

One of the disadvantages of conventional motor vehicle power booster brake systems is that the brake pedal usually must be depressed almost 40% of its total travel before the brakes are applied. The invention relates to a brake actuating linkage that can be operated either by the hands of the vehicle operator or by the conventional brake pedal; and one that provides a full application of the brakes with just enough travel of the brake pedal or hand-operated control to move the pedal or control away from its rest position. The invention further provides means for varying the travel of the operator-controlled actuator, and means for applying the brakes in case of a power failure.

Other objects, features and advantages of the invention will become apparent upon reference to the succeeding,

2 detailed description thereof, and to the drawings illustrating the preferred embodiments thereof; wherein, FIGURE 1 shows, schematically, a cross-sectional view of a known type of power brake system;

FIGURE 2 shows an enlarged cross-sectional view of one embodiment of the invention; and, FIGURES 3, 4 and 5 show another embodiment of the invention.

As stated previously, one of the primary objects of the invention is to provide an actuating linkage for a motor vehicle power brake system that causes a full application of the brakes almost simultaneously with activation of the system by the vehicle operator. The conventional power booster brake usually has a brake pedal connected mechanical linkage constructed such that in order to provide the desired mechanical advantage and low power feedback or reaction force, the brake pedal travel is substantially proportionate to the travel required of the master cylinder operating rod to initiate operation of the power boost servo. For panic stops, the foot pedal travel necessary may be too long to prevent an accident. This is especially true when the conventionally mounted brake pedal is used to actuate the system, since the reaction time of the driver between seeing a danger and fully applying the brakes is approximately four seconds. The invention reduces the pedal travel required to a minimum.

FIGURE 1 shows the parts of a known type of power brake system. It includes a fluid pressure actuated mechanical friction brake 10 for each of the four wheels of a motor vehicle. The brakes per se are of a known construction, and include a drum 12 secured to the wheel and cooperating with a pair of arcuately movable primary and secondary brake shoes 14 and 16. The shoes are pivotally anchored at one end against stationary pins 18, and are biased inwardly at their opposite end against the plunger ends of a wheel cylinder 20. The wheel cylinders are actuated by fluid under pressure supplied to branch lines 22 from a line 24 connected to a high pressure master cylinder outlet port 26.

The master cylinder assembly 28 includes a conventional master cylinder unit 29 and a vacuum differential operated servo unit 30. Unit 29 includes the usual brake fluid reservoir 31 communicating fluid through a compensating port 32 and an inlet 34 to the master cylinder bore 36 and port 26. The bore slidably contains a piston 38 having primary and secondary one-way cup seals 40 and 42, the piston being spring biased against the end of a master cylinder push rod 44. The bore also contains a residual pressure one-way check valve 46.

Push rod 44 extends sealingly through one side of the servo unit housing 47. The housing has two internal fluid chambers 48 and 50 defined by an annular diaphragm 52 joined to the housing and to a power piston 54. The power piston has a sleeve extension 56 slidable through the opposite housing side, and is biased to the position shown by a spring 58. The left-hand side of piston 54 is recessed to slidably receive the plunger end 60 of rod 44, which acts against a rubber reaction disc 62.

The right-hand piston portion slidably receives a valve plunger 64 secured to a valve operating rod 66. The right edge 67 of plunger 64 cooperates at times with an annular rubber-like sequencing valve 68. The valve is fixed at one edge to the piston sleeve extension 56, and is biased to the left by a spring 69. When plunger 64 is moved to the left, the left edge of valve 68 seats against a shoulder 70 on the piston body to define a closed annular chamber 72. Chamber 72 connects with servo chamber 48 by a passage 74. The outer annular space 75 between plunger 64 and piston 54 is connected by a control passage 76 to servo chamber 50.

Valve operating rod 66 is pivotally secured to the upper end of a lever 78 arcuately swingable about a fixed pivot pin 80. Near its median point, it is pivotally connected to a link 82 pivotally secured at its other end to a conventional brake pedal lever 84. Lever 84 in turn is pivotally connected at its upper end 86 to a stationary portion of the vehicle body.

In operation, with the brake released, the parts are as shown, the sequencing valve 68 seating against plunger 64. Vacuum admitted to servo chamber 48 through a check valve 88 passes through passages 74, 75 and 76 to chamber 50 to balance the fluid pressure on opposite sides of piston 54. In applying the brakes, leftward movement of the brake pedal lever 84 and link 82 causes substantially an equal travel of valve operating rod 66 and plunger 64 to initially seat sequencing valve against piston shoulder 67. This closes chamber 72. Continued leftward movement of rod 66 separates plunger 64 and sequencing valve 68 to admit atmospheric air from the open end of sleeve 56 to control passage 76, and, therefore, to the right-hand servo chamber 50. This causes a movement of power piston 54 to the left to actuate the master cylinder piston 38 to the left to apply the brakes. The degree of movement will of course depend upon the modulated movement of plunger 64 by pedal lever 84. As the power piston moves, the plunger 64 and rod 66 also continue to move, causing further travel of brake pedal lever 84.

As the fluid pressure in the brake line 24 builds up, the reaction force acts on the reaction disc 62. The larger portion of this force acts against power piston 54, the smaller area opposite plunger 64 transmitting a small feedback force through the linkage and brake pedal to the driver. When the reaction force against the brake pedal equals the foot effort of the driver, the power piston 54 will stop moving. Release of the foot pedal will of course cause a reverse operation to return the parts to the positions shown.

The above is a known construction and operation, and further details are therefore not given. It will be clear, therefore, that with the known type of actuating linkage, the brake pedal lever 84 must travel substantially the same linear distance as is required of the valve plunger 64 before and while the power piston 54 moves to apply the brakes.

Turning to the invention, FIGURE 2 shows a mechanical linkage that permits the vehicle brakes to be applied by only a fractional movement of the fingers of the vehicle operator, or by depression of the conventional brake pedal, or by both. More specifically, the foot pedal movable link or lever 78' is pivotally secured by a pin 90 to a sleeve 92. The sleeve has a number of spaced fingers 94 that abut the edge of a sleeve 96 bonded or otherwise fixed to the power piston sleeve extension 56'. The valve operating rod 66' extends slidably through sleeve 92 and is pivotally mounted on pin 90 of lever 78' by lost motion means consisting of an enlarged eyelet 98. A second arcuately movable lever 100 is pivotally mounted on the pin 101 connecting lever 78' and link 82'.

At its upper end, lever 100 is formed with an inner arcuate surface 102 abuttable against the rod portion defining eyelet 98. Lever 100 extends downwardly to a point below and to the left of the fixed pivot 80' for connection with a substantially linearly movable finger actuated rod 104. Rod 104 would be connected in any suitable manner to a point in the vehicle driver compartment accessible to the fingers or hands of the driver. For example, rod 104 could be connected to an actuating mechanism installed on the steering wheel of the vehicle, or on the steering column adjacent the steering wheel, or on the dashboard.

In operation, movement of control rod 104 to the right initially rotates lever 100 counterclockwise about pin 101 to move valve operating rod 66' and plunger 64' to the left a distance equal to the clearance 106 between the pivot pin 90 and the eyelet 98. This distance is sufficient to provide the necessary travel of rod 66' and plunger 64 to open servo chamber 50 to atmospheric air, and thereby activate the vacuum servo in the manner previously described, without causing a movement of lever 78'. The reaction in this case is taken by the sleeve fingers 94 acting against the servo extension sleeve 56', which is stationary at this time, so that no movement of brake pedal lever 84' occurs. The power piston 54 will then move to the left and through sleeve 96 pivot both levers 78' and 100 substantially together about the fixed pivot 80'.

With this construction, it will be noted that the rod 104 will not move further to the left than is required to initiate the servo action since the fulcrum changes from the pin 101 to a point adjacent pin 80'. Also, once the servo piston 54 moves, rod 104 will be returned to the left essentially to its initial rest position. The travel of rod 104, of course, is controlled simply by changing the radial distance (R) from pin 80' to the line of force applied through rod 104 to lever 100. That is, by positioning the point of connection of rod 104 to lever 100 horizontally in line with the pivot pin 80' ($R=0$), the amount of lateral or horizontal travel of rod 104 necessary to cause a movement of plunger 66' sufficient to initiate movement of piston 54 is substantially zero; that is, just enough to move the rod 104 from its rest position. If connected in this manner, the two levers 78' and 100 would have substantially instantaneous centers about which the two levers pivot during movement of servo 54, resulting in an extremely small travel of rod 104.

It is to be noted, therefore, that the travel of the finger actuated rod 104 will be proportional to the distance of the connection of rod 104 to lever 100 from the pivot pin 80', and, that the travel can be adjusted independently of the feel or feedback force on the fingers. Also, since the feedback force will be determined by the ratio $A/B$, it can be adjusted as desired.

In addition to actuation of the brakes by the finger controlled rod 104, the brake foot pedal lever 84' can be used to move lever 78' and valve operating rod 66' in essentially the same manner as described in connection with the FIGURE 1 showing. The pedal in this case would have essentially the same travel as that of FIGURE 1.

FIGURE 3 shows a modification to permit operation of the system solely by the brake pedal, and with only extremely small pedal travel, much in the same manner as described in connection with the finger actuated rod 104 in FIGURE 2. In this case, the pedal actuated link 82" is extended around the fixed pivot 80" of lever 78", and is pivotally connected to lever 100" at a point 108 laterally spaced from the fixed pivot 80" but substantially on the same horizontal axis. The two levers 78" and 100" are interconnected at their upper ends by a pivot pin 110, the lever 100", in this case, having a cam surface 112 engaging a mating surface on a boss 114 on rod 66". A further change is the addition of a reaction pin 113 for fail-safe operation in a manner to be described.

In this case, the two primary pivot points 80" and 108 again provide substantially instantaneous centers about which the two levers 78" and 100" pivot when the servo piston 54 pulls sleeve 92" to the left in a manner similar to that described in connection with the FIGURE 2 showing. Thus, only enough lateral movement of brake pedal lever 84" to move the lever from its rest position is necessary to cause movement of the upper end of lever 100" to trigger the sequence valve 68 (FIGURE 1) to operate the system.

FIGURE 4 shows in full lines the brake released starting position of the parts in the FIGURE 3 embodiment, and in dotted lines, the positions when the brake are applied. It will be seen that the pin 108 moves essentially vertically, and that, therefore, the pedal travel is substantially zero. If link 82" were connected to link 100" at the location indicated by dotted line 116, it can be seen that the pedal travel will increase. This, of course, is a method for adjusting the pedal travel to the desired amount. A small amount of pedal travel is probably desirable, but not necessary, to maintain good modulation of the servo piston movement. Movement of levers 100" and 78" by the servo will return the brake pedal to its original position.

In the event of a power failure or vacuum runout, the brake can be actuated solely by continued leftward movement of brake pedal lever 84". In this case, the lower end of lever 100" will abut the pin 113, and then pivot both levers 100" and 78" counterclockwise to fully apply the brakes. This is shown in FIGURE 5. The force on the link 82" will be the feedback force on rod 65" times the ratio $D/C$.

From the foregoing, therefore, it will be seen that the invention provides a mechanical linkage for actuating a power booster brake assembly in which the linear movement of the operator actuated mechanism is extremely small and controllable to the degree desired to provide full braking, in one case, with substantially very little finger movement, and in another case, the driver can, by merely moving the conventional brake pedal from its brake released position, provide full activation and application of the brakes. Also, the reaction or feedback force can be adjusted independently of the travel.

While the invention has been illustrated in its preferred embodiments in the figures, it will be clear to those skilled in the arts to which the invention pertains that many changes and modifications may be made thereto without departing from the scope of the invention.

I claim:

1. A force transmitting linkage comprising first and second pivotally connected links, additional means securing one of said links for a pivotal movement about a stationary point, further means interconnecting said links for a limited relative pivotal movement therebetween, and means for moving one of said links independently or concurrently with the other of said links, said links being pivotally interconnected adjacent their ends and adjacent the end of said one link opposite its fixed pivot point.

2. A brake actuating mechanism for a power boost brake assembly having a master cylinder piston movable by an operating rod operably connected thereto, a fluid pressure differential operated servo mechanism operably connected to and between said piston and rod having control means rendered operable upon initial movement of said rod in one direction to move said piston independently of said rod, comprising, a mechanical linkage including a first lever arcuately movable about a fixed pivot at one end, a manually movable second lever having a fixed pivotal connection to said first lever and being operatively connected to said rod, lost motion means between said levers permitting a limited arcuate movement therebetween of each relative to the other, substantially linear movable force means for moving said manually movable lever, and means operatively connecting said first lever to said control means for movement of said levers and rod by said control means subsequent to the said initial movement of said rod and movement of said first lever relative to said second lever and rod sufficient to render inoperable said lost motion connection.

3. A brake mechanism as in claim 2, wherein the force applied to said second lever acts along a line passing essentially through said first lever fixed pivot axis.

4. A brake mechanism as in claim 2, wherein the application of force to said second lever is made at a point adjacent said fixed pivot providing substantially instantaneous centers for said levers for the substantially concurrent pivotal movement of said levers thereabout, thereby minimizing the linear travel of said linear movable means.

5. An operating mechanism for use in a fluid pressure actuated brake assembly having a master cylinder operating rod movable to apply fluid under pressure to said brake, and power booster servo means operatively connected between said master cylinder and said operating rod for power actuation of said brake upon a predetermined movement of said rod, comprising, a first lever arcuately swingable about a fixed pivot at one end, lost motion means operably connecting said first lever and rod, a second arcuately swingable lever pivotally connected to said first lever at a point spaced from said fixed pivot, said second lever having means abutting said rod, means operably connecting said servo means and said first lever, and manually operated means for applying a force to said second lever to initially move said rod to actuate said servo means whereby said lever and rod are moved thereby, application of force by said manually operated means occurring at a point on said second lever adjacent the said first lever fixed pivot thereby minimizing travel of said manually operated means.

6. An actuating mechanism for a power operated brake assembly having a hydraulic master cylinder, and a fluid pressure differential operated servo and a manually operated operating rod connected in series to said master cylinder, comprising, a sleeve slidable with respect to and concentrically mounted on said operating rod, means operably connecting said sleeve to said servo for movement of said sleeve in one direction, lost motion means connecting said sleeve and rod, a first lever fixed to said sleeve and pivotally swingable about a fixed pivot at one end, a second lever pivotally connected to said first lever and operably connected to said rod, said second lever extending to a point adjacent said first lever pivot point, and substantially linear movable manually operated means for moving said second lever to initially move said rod relative to said first lever and sleeve, means responsive to the initial movement of said rod for activating said servo to actuate said master cylinder and move said sleeve and levers, the location of said second lever adjacent said fixed point providing substantially instantaneous centers for the concurrent pivotal movement of said levers thereabout by said servo whereby the linear travel of said linear movable means is minimized.

7. An actuating mechanism as in claim 6, said levers being pivotally interconnected at their ends opposite to the fixed pivot.

8. An actuating mechanism as in claim 6, said levers being pivotally interconnected between their ends and between the said fixed pivot and interconnection between said rod and sleeve.

9. An actuating mechanism as in claim 6, including a brake pedal connected to said second lever.

10. An actuating mechanism as in claim 6, including a brake pedal connected to said first lever for moving said first lever and rod independently of said manually movable means.

11. An actuating mechanism as in claim 10, said manually movable means being actuatable by the fingers of the motor vehicle operator.

12. An actuating mechanism as in claim 6, said levers being pivotally interconnected at their ends opposite to the fixed pivot including a brake pedal connected to said second lever.

13. An actuating mechanism as in claim 6, said levers being pivotally interconnected between their ends and between the said fixed pivot and interconnection between said rod and sleeve, including a brake pedal connected to said first lever for moving said first lever and rod independently of said manually movable means, said manually movable means being actuatable by the fingers of the motor vehicle operator.

14. An actuating mechanism as in claim 12, the line of force applied to said second lever passing essentially through or slightly below the axis of said fixed pivot.

15. An actuating mechanism as in claim 13, the line of force applied to said second lever passing essentially through or slightly below the axis of said fixed pivot.

16. An actuating mechanism as in claim 6, including additional fulcrum means in the path of movement of said second lever for the pivotal movement of said second lever thereabout upon a predetermined movement of said second lever by said manually operated means.

References Cited

UNITED STATES PATENTS

| | | | |
|---|---|---|---|
| 1,620,744 | 3/1927 | Tibbetts | 74—481 X |
| 1,852,286 | 4/1952 | Bragg et al. | 74—481 X |

DUANE A. REGER, *Primary Examiner.*